June 4, 1968 J. D. BUNGARD ETAL 3,387,117

DATA STORAGE DEVICE FEED APPARATUS

Filed March 16, 1964 6 Sheets-Sheet 1

INVENTORS.
James D. Bungard
Paul E. Becking
BY
Harness, Dickey + Pierce.
ATTORNEYS.

INVENTORS.
James D. Bungard
Paul E. Becking
BY
Harness, Dickey & Pierce
ATTORNEYS.

DATA STORAGE DEVICE FEED APPARATUS

Filed March 16, 1964 6 Sheets-Sheet 3

INVENTORS.
James D. Bungard
Paul E. Becking
BY
Harness, Dickey & Pierce
ATTORNEYS.

June 4, 1968 J. D. BUNGARD ETAL 3,387,117

DATA STORAGE DEVICE FEED APPARATUS

Filed March 16, 1964 6 Sheets-Sheet 4

INVENTORS.
James D. Bungard
Paul E. Becking

BY Harness, Dickey & Pierce
ATTORNEYS.

June 4, 1968 J. D. BUNGARD ETAL 3,387,117

DATA STORAGE DEVICE FEED APPARATUS

Filed March 16, 1964 6 Sheets-Sheet 5

INVENTORS
James D. Bungard
Paul E. Becking
BY
Harness, Dickey & Pierce
ATTORNEYS June 4, 1968 J. D. BUNGARD ET AL 3,387,117

DATA STORAGE DEVICE FEED APPARATUS

Filed March 16, 1964 6 Sheets-Sheet 6

INVENTORS.
James D. Bungard
Paul E. Becking
BY
Harness, Dickey & Pierce
ATTORNEYS United States Patent Office 3,387,117
Patented June 4, 1968

3,387,117

DATA STORAGE DEVICE FEED APPARATUS

James D. Bungard, East Detroit, and Paul E. Becking, Lake Orion, Mich., assignors to Dura Corporation, Oak Park, Mich., a corporation of Michigan Filed Mar. 16, 1964, Ser. No. 352,232
19 Claims. (Cl. 235—61.9)

This invention relates to business machines and more particularly to data storage device feed apparatus associated therewith.

An object of the invention is to provide new and improved feeding apparatus for associating multiple types of data storage devices with reader means and/or punch means.

Another object is to provide new and improved combination card and tape type data storage device feeding apparatus for reader means and punch means.

A further object is to provide a typewriter-punch-reader combination capable of alternately utilizing tape or card type data storage devices.

The aforementioned objects, and others, have been attained by utilization of the inventive principles hereinafter disclosed with reference to an illustrative embodiment of the invention as shown on the accompanying drawing in which:

FIGURE 6 is a perspective view of a portion of the apparatus shown in FIGURE 5;

*In general*

The invention is illustratively shown in combination with a business machine comprising: a writing unit in the form of an electric typewriter; a punch means selectively operable in response to typewriter operation to code data storage means by punching holes therein representative of the operations performed by the typewriter; and a reader means selectively operable to read a coded data storage means and generate control signals causing operation of the typewriter in a predetermined manner. A business machine of the general type hereinbefore described is currently commercially available and is the subject of copending application Ser. No. 227,767 and now abandoned, filed Oct. 2, 1962, for Writing System, assigned to the assignee of this invention, and hereby incorporated by reference into this specification in its entirety.

The various components of the subject business machine are enclosed within a common casing and operated by a common power source. The electric typewriter, having a manually operable keyboard, is centrally located within the casing. The punch means, provided to code the data storage means, is mounted along and connected to one side of the typewriter. Suitable control mechanisms and control circuitry are provided to selectively actuate the punch means in accordance with typewriter operation. The reader means is similarly located and mounted on the other side of the typewriter. Signals generated by the reader means are utilized to selectively actuate the typewriter through suitable control mechanism and control circuitry. A common power source, in the form of an electric motor, is provided to actuate the typewriter, the punch, and the reader.

A specific purpose of this invention is to provide handling means for different types of data storage means of varying sizes and shapes such as paper tape and card devices so that either cards or tapes may be efficiently and easily associated with the punch and/or the reader of the aforedescribed business machine. However, some of the inventive concepts will be seen to have more general applicability by those skilled in the art to which the invention relates.

Figures 5, 10, 11:
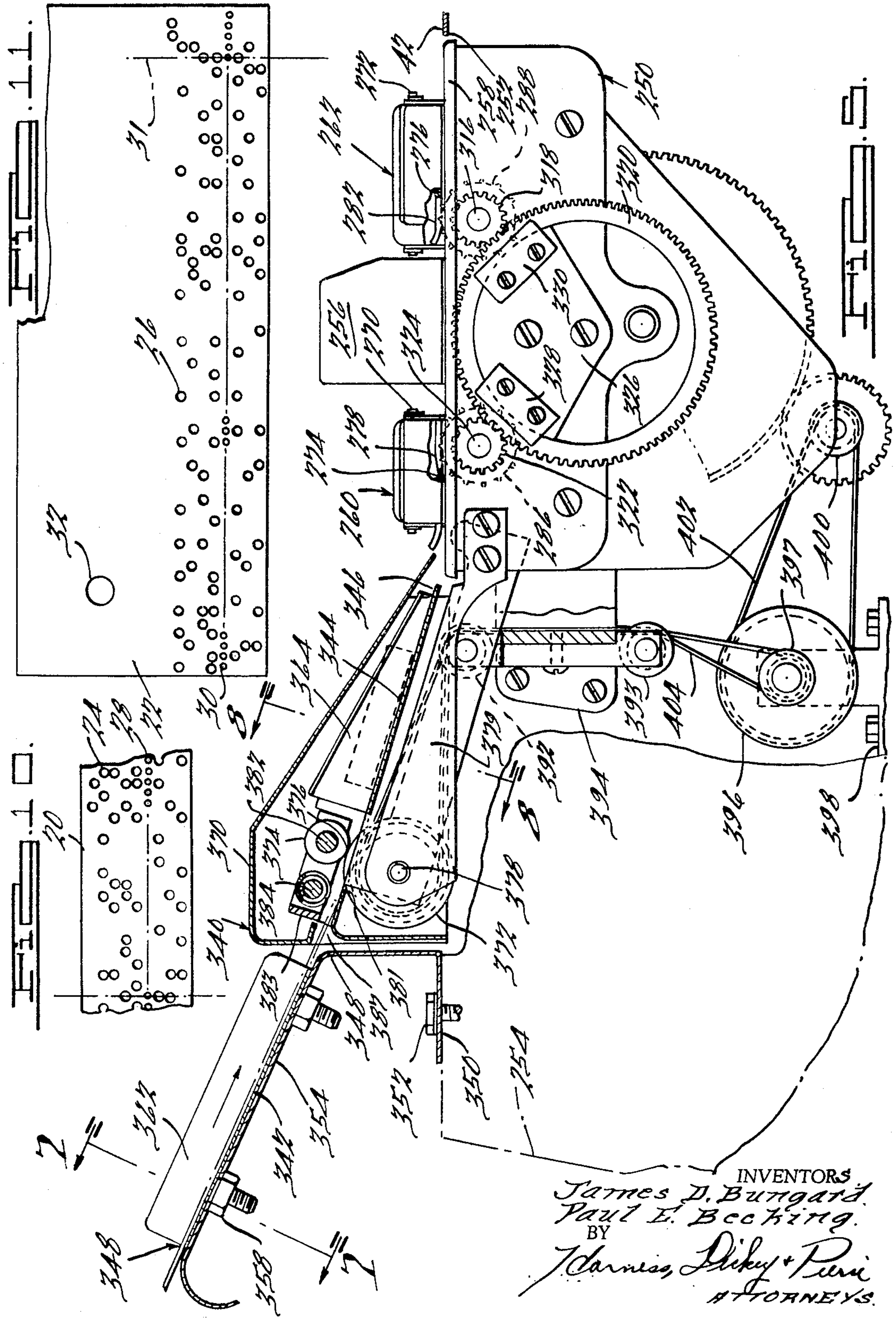
FIGURE 5 is a side elevational view with parts broken away and partly in section of the apparatus shown in FIGURE 4.
FIGURE 10 is a plan view of a portion of paper tape type data storage device.
FIGURE 11 is a plan view of a paper card type data storage device.
Figures 7, 8, 9:
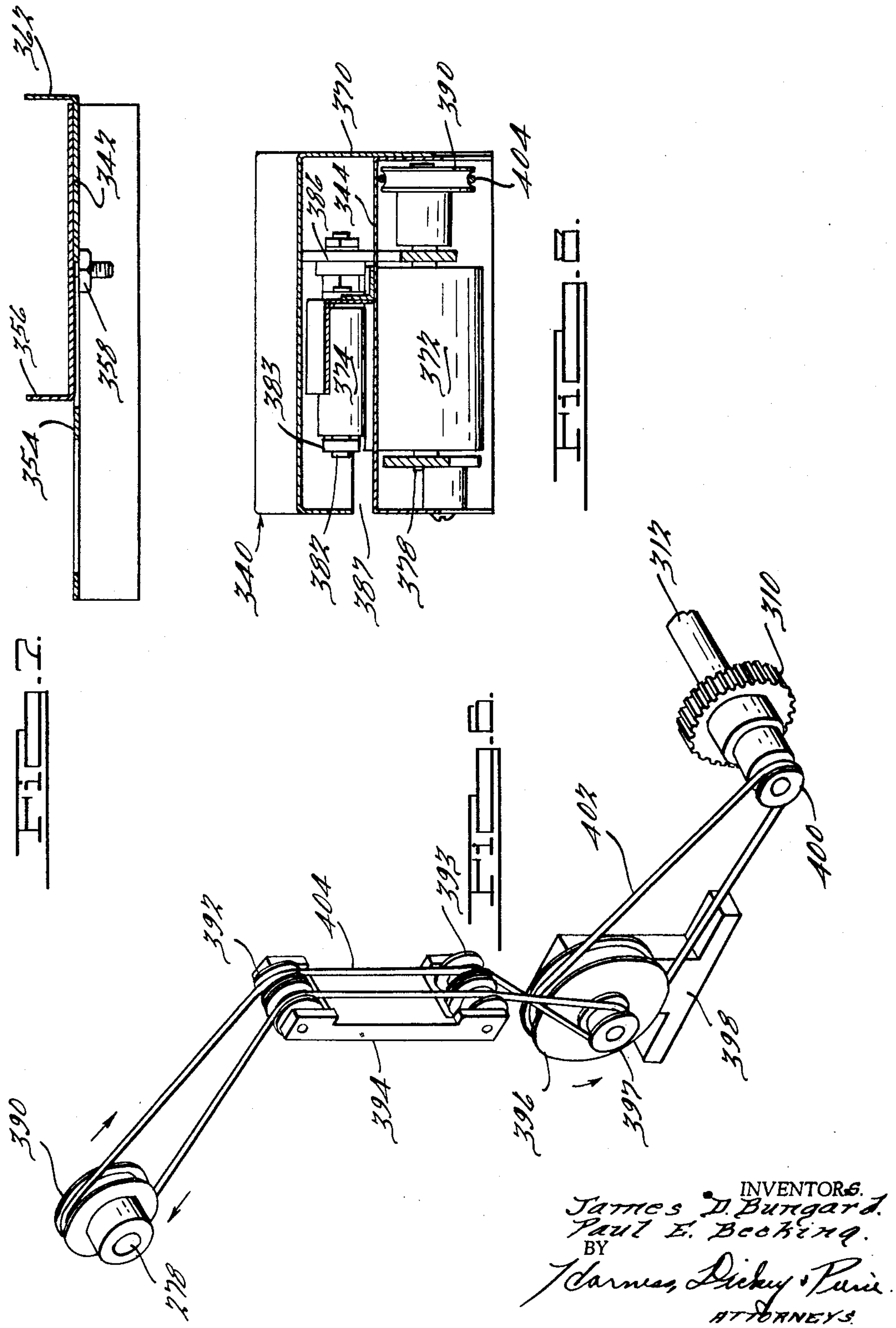
FIGURE 7 is a sectional view taken along the line 7—7 in FIGURE 5.
FIGURE 8 is a sectional view taken along the line 8—8 in FIGURE 5.

A portion 20 of a relatively narrow width tape type data storage device is shown in FIGURE 10 and a relatively wide width card type data storage device 22 is shown in FIGURE 11. Each device is illustratively shown to utilize an equal width conventional 8-channel data storage arrangement in which code holes 24, 26 are selectively provided along each channel. Each device also includes a series of equally spaced drive apertures 28, 30. The code holes may be seen to be transversely aligned with the drive apertures in code columns 31, each code column being separately punched or read in operation of the associated business machine when properly located. In addition, the card device is provided with integral feed control means, in the form of an enlarged aperture 32, for a purpose to be hereinafter discussed in detail.

*Data storage device feed apparatus for punch*

Figure 1:
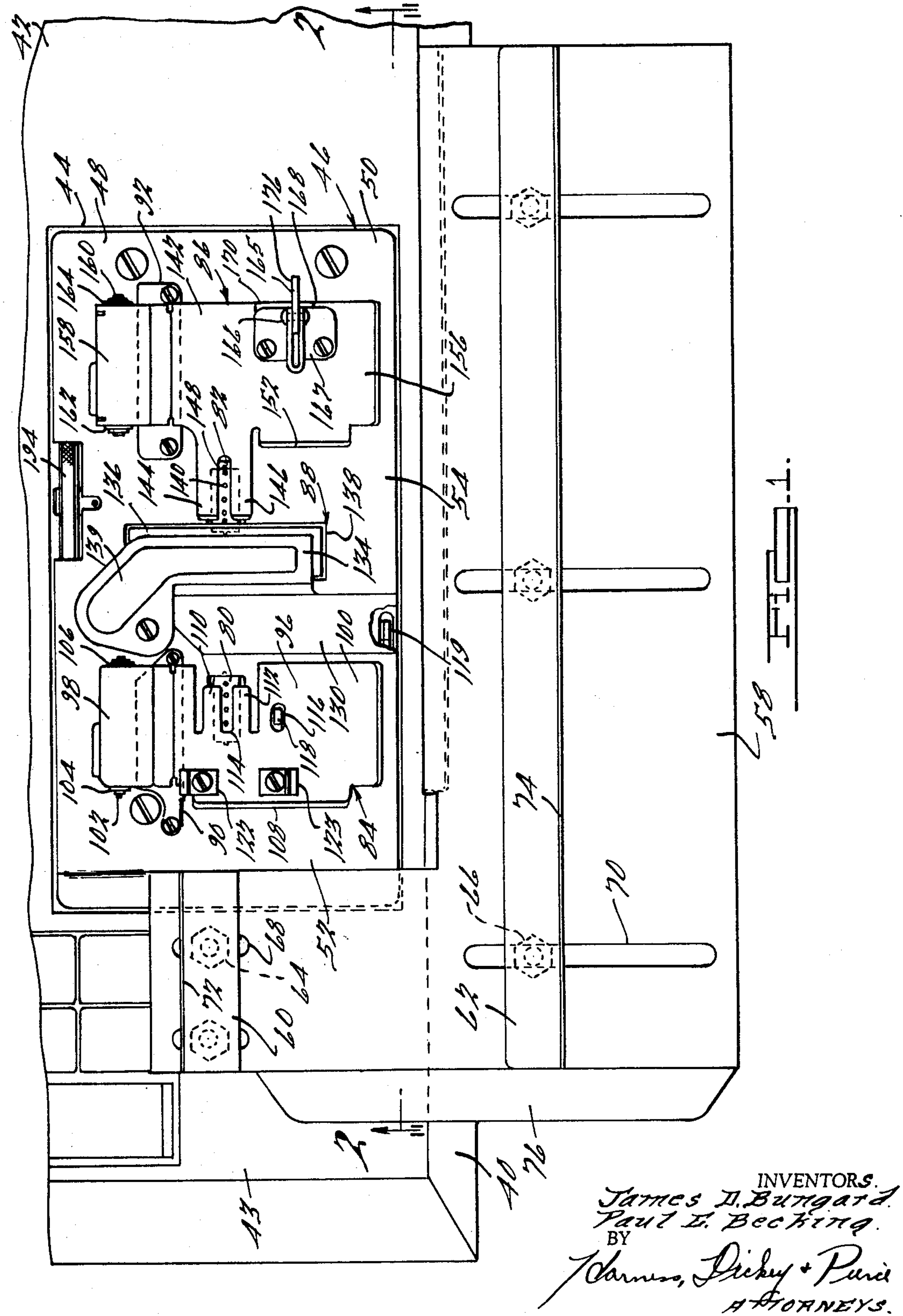
FIGURE 1 is a plan view of punch feed apparatus integrally associated with punch means of a business machine including an electric typewriter which is capable of both manual and automatic operation.
Figure 2:
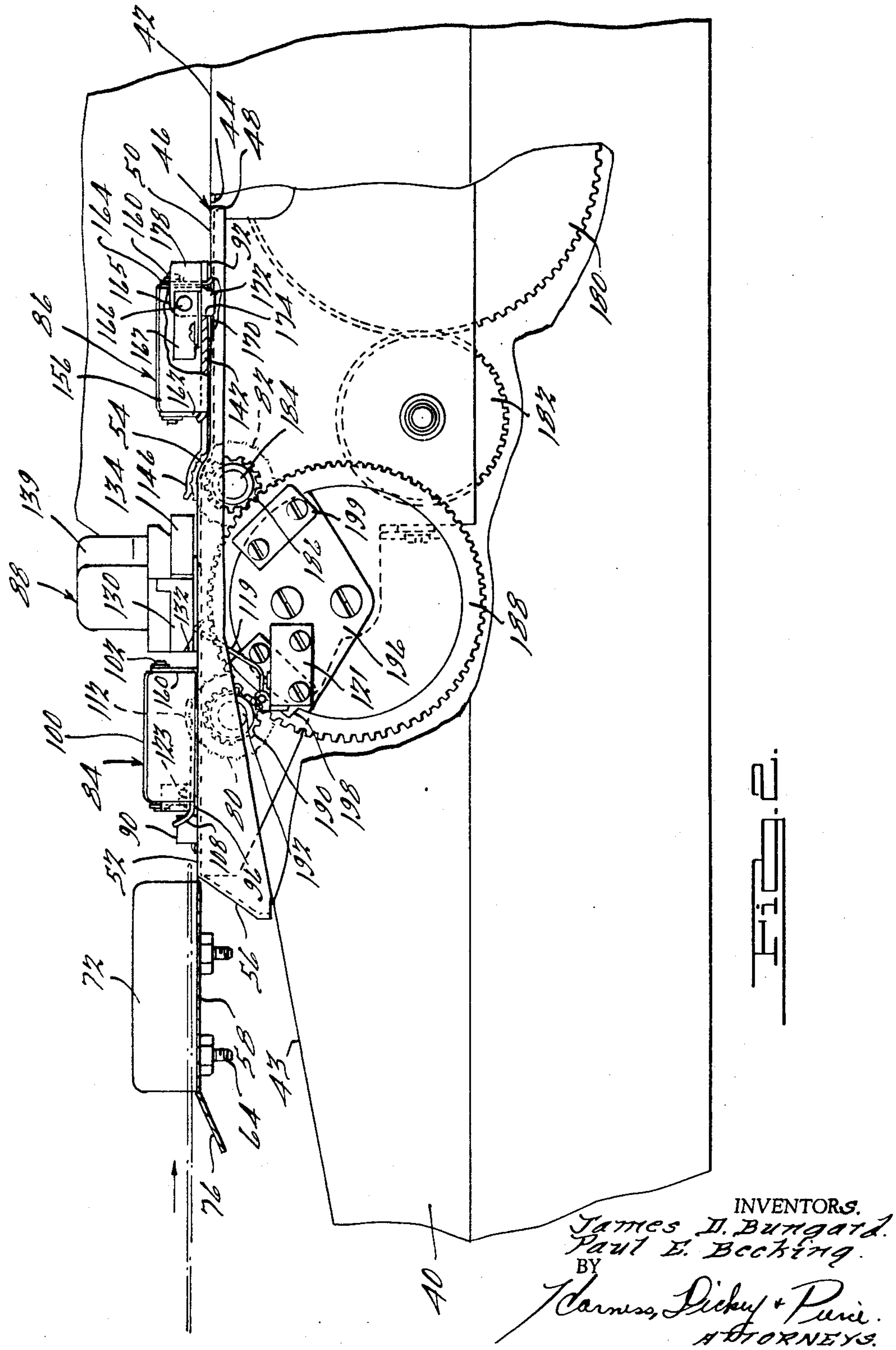
FIGURE 2 is a sectional view taken along the line 2—2 in FIGURE 1.

Referring now to FIGURES 1 and 2, a portion of one side of the business machine casing is shown at 40. A flat upper wall portion 42 and an inclined portion 43 are provided with a cutout 44 in which the punch means 46 is mounted. A plate member 48 is mounted within the cutout and extends substantially horizontally. However, the rear portion 50 is at a lower elevation than the front portion 52 and is connected thereto by an upwardly curved central portion 54.

The front portion of the plate is downwardly inclined at 56 and an L-shaped extension plate 58 is fixedly mounted immediately adjacent thereto. Guide brackets 60, 62 are adjustably mounted on the extension plate by suitable fastening devices 64, 66 slidably mounted in slots 68, 70. Inner surface of upwardly extending side wall portion 72 provides a guide surface for the various type data storage devices. Inner surface 74 also provides a guide surface for card type data storage devices or the like and may be adjusted to provide the proper spacing therefor. A downwardly inclined approach surface 76 may be provided to facilitate insertion of a card or the like along the guideway provided by the side wall portions 72, 74.

Combination card and tape feed means are provided in slots in plate 48 and comprise spaced cogwheel type drive means 80, 82 extending upwardly beyond the upper surface of the plate and associated pressure plate means 84, 86. A common punch type coding means 88 is located between the drive means 80, 82. Guide surface 72 is continued across the plate 48 by aligned inner surfaces of guide plate members 90, 92 suitably secured thereto.

Pressure plate 84 comprises a central portion 96 spaced closely adjacent the plate 48 and upwardly extending end portions 98, 100. End portion 98 is pivotally mounted on a shaft 102 supported between spaced bracket flanges 104, 106 which may be struck upwardly out of the plate 48. Spring means (not shown) bias the pressure plate toward the closed position shown and the end portion 100 provides a handle which may be utilized to pivotally move the pressure plate upwardly to an open position. The front edge 108 of the pressure plate may be upwardly turned to facilitate movement of the data storage means therebelow. The central portion 96 of the pressure plate is slotted to provide curved finger elements 110, 112 spaced on opposite sides of the drive means 80, which comprises a rotatably driven cogwheel, so that the cogs extend upwardly into the central slot 114 and the curved finger elements extend substantially parallelly around the cylindrical portions of the cogwheel on each side of the cogs in closely spaced relationship.

A switch actuating finger receiving slot 116 is provided in the central portion and permits a switch actuating finger 118 extending upwardly through a slot in plate 48 to be disposed in the path of travel of a data storage device passing beneath the pressure plate. A similar switch actuating finger 119 extending upwardly through a slot in plate 48 is spaced rearwardly and outwardly of finger 118. The associated switches 120, 121 are located beneath the plate 48 as shown, for example, at 121 for a purpose to be hereinafter explained in further detail. It may be noted that the actuating finger 118 is located in substantial alignment with the data storage device-cogwheel contact area.

Pressure plate 84 and drive means 80 are provided for use with card type data storage devices and tape guide bracket means 122, 123 are mounted thereabove to enable tape type data storage devices, which initially have no cog receiving drive apertures, to move thereover.

The common punch head unit 88 is provided to code both card devices and tape devices and comprises a channel forming plate 130 having a beveled approach surface 132 and a punch die plate 134 mounted in spaced relation above a punch guide plate 136 which is supported in a central slot 138 in the plate 48. Individual punch members (not shown) are adapted to be selectively driven upwardly from the guide plate 136 through the data storage means into aligned apertures (not shown) in the die plate. A chute 139 may be provided to remove the paper clippings.

Drive means 82, which also takes the form of a cogwheel having radially extending cogs 140, and pressure plate 86 are used for both card and tape type data storage devices. A flat central portion 142 of the pressure plate is located closely adjacent the upper surface of plate 48 in the closed position and includes forwardly extending finger portions 144, 146 which are separated by a central slot 148. Cogwheel 82 is located in alignment with the curved portion 54 of the plate 48 and extends upwardly through a slot in plate 48 with the cogs received in the slot 148. The fingers are curved upwardly and located in parallel spaced relationship to the upper surface of the plate. Front edges of the plate may be upwardly turned, as indicated at 152, to facilitate insertion of cards and tapes. Such an arrangement provides an exceptionally good driving relationship between the cogwheel and the data storage means.

End portion 156 of the pressure plate extends upwardly to provide a handle for pivotally moving the plate upwardly from the closed position shown to an open position against the bias of a spring element (not shown). End portion 158 is pivotally mounted on pin 160 supported between upstruck flanges 162, 164 in plate 48 to accommodate the pivotal movement.

A tape guide means is mounted on the pressure plate 86 and comprises an L-shaped plate 165 swingably supported on a shaft 166 carried by a bracket 167 fastened to the top of the pressure plate and extending over a slot 168 formed therein. A slot 170 is also provided in the plate 48 to enable one leg portion 172 of the guide plate to extend downwardly below the upper surface of the plate 48 whereby the front edge 174 may be positioned in the path of movement of a card and the inner side surface 176 may be positioned for guiding engagement with a tape. The other leg portion 178 is shaped, located, and weighted so as to tend to maintain the leg portion 172 in its lowermost position.

Data storage device drive means 80, 82 are synchronously driven by a common power source provided by the associated typewriter through a one way clutch mechanism (not shown) and a gear train adjacent the typewriter including gear elements 180, 182 which are drivably connected by other gear elements and the clutch to shaft 184 on which cogwheel 82 is fixedly mounted. The details of such a clutch mechanism are disclosed in detail in the aforementioned copending application and are otherwise generally known. A pinion 186 is mounted on one end of shaft 184 and drivably engages a ring gear 188 which in turn drives a pinion 190 mounted on shaft 192 on which cogwheel 80 is secured. A hand wheel 194 may be mounted on the other end of shaft 184 for manual adjustments. Segment plate 196 and shoe plates 198, 199 rotatably support the ring gear and serve to minimize the problem of maintaining controlled step-by-step rotation of the cogwheels by reducing the weight of the connection between pinions 186, 190 and hence reducing the inertia thereof.

*Operation of punch feed apparatus*

Figures 3, 9:
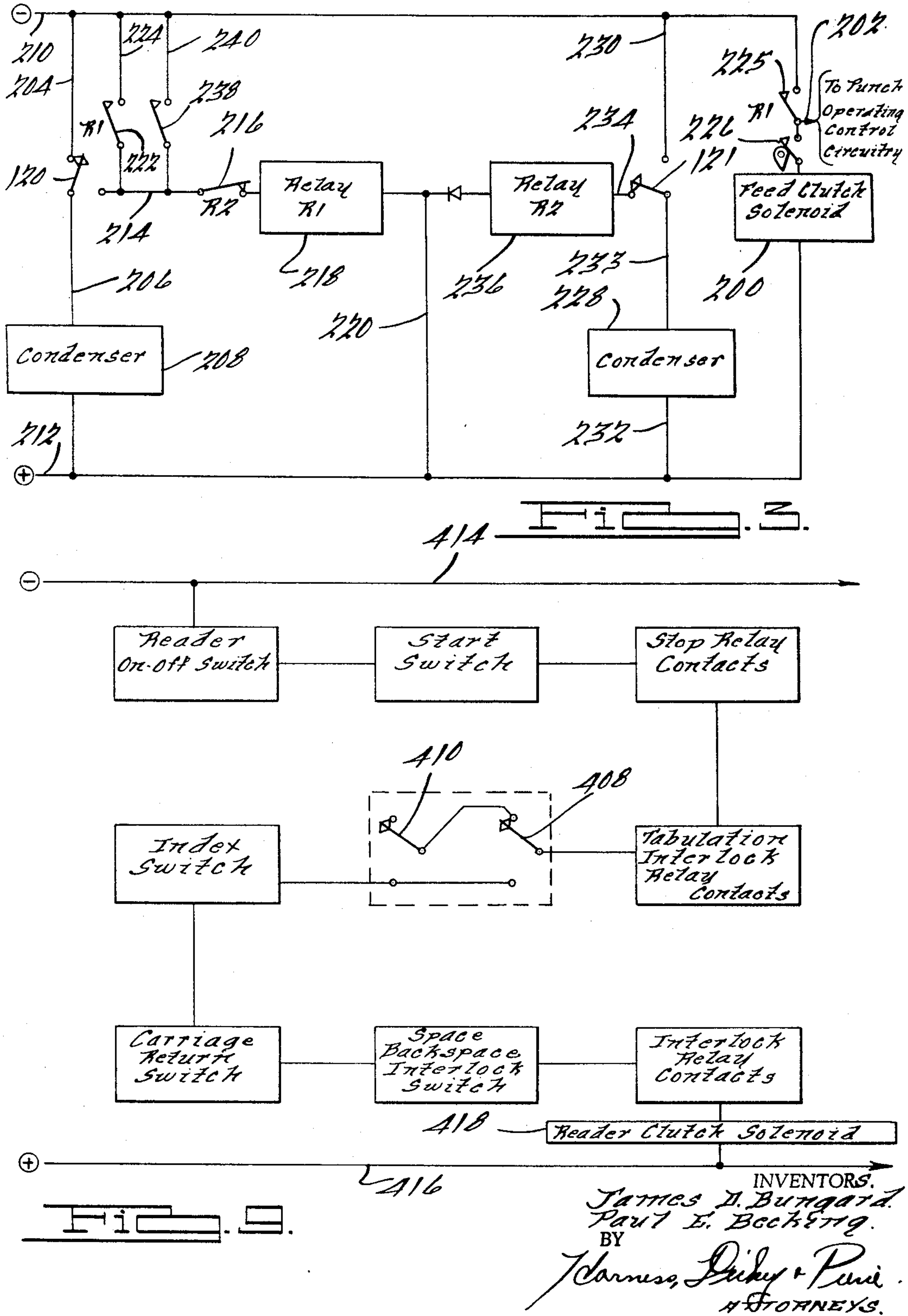
FIGURE 3 is a diagrammatic illustration of circuitry associated with the punch feed apparatus.
FIGURE 9 is a diagrammatic illustration of circuitry associated with the reader feed apparatus.

Referring now to the circuit diagram shown schematically in FIGURE 3, the switches 120, 121 are connected in circuit to a punch feed clutch solenoid 200 and punch operating circuitry indicated illustratively on line 202. Energization of the punch feed clutch solenoid enables rotation of the drive shafts 184, 190 sufficient to advance the tape or card step-by-step one code column at a time. Energization of the punch operating circuitry causes actuation of one or more of the punches to perforate the tape or card.

The switch 120 is normally in a closed position between conductors 204, 206 and connects a condenser 208 between sources of opposite potential 210, 212. Consequently, the condenser is normally charged when the machine is on and, when switch 120 is actuated by contact of the leading edge of a data storage device with finger 118 to connect line 206 to line 214, the condenser discharges through line 206, switch 120, line 214, normally closed relay contacts 216, relay winding 218, and line 220. Relay 218 is energized and actuates contacts 222 to provide a holding circuit through line 224. Normally open contacts 225 are also actuated to complete a circuit through the punch feed clutch solenoid 200. Whenever a timing cam switch 226 is closed during machine operations, the punch clutch solenoid is repetitively energized to feed the data storage device to the punch head until such time as the device is properly positioned in the punch head.

As the data storage device is being driven into position, the lead edge contacts the switch actuating finger 119 and actuates the switch 121 which results in connecting a condenser 228 between the opposite sources of potential 210, 212 through lines 230, 232. The condenser is charged and when the control aperture 32, which is aligned with the actuating finger 119 of switch 121, reaches the finger 119, the switch 121 is actuated and connects line 233 to line 234. The condenser 228 discharges energizing relay winding 236 through line 220 and opening contacts 216 to disable the holding circuit for relay 218. Consequently, contacts 222 and 225 are opened. In this position of the data storage device, the first code column is aligned with the punches below the die plate. If it is desired to feed the data storage device beyond the initial position, a feed switch 238 may be manually actuated by the machine operator to energize relay 218 through a line 240. The data storage device will then be fed through the punch head in step-by-step fashion until the switch 238 is opened. As the card is fed inwardly, the switch 121 is again closed by contact with the card so that relay 236 is de-energized and contacts 216 are again closed.

*Data storage device feed apparatus for reader*

Figure 4:
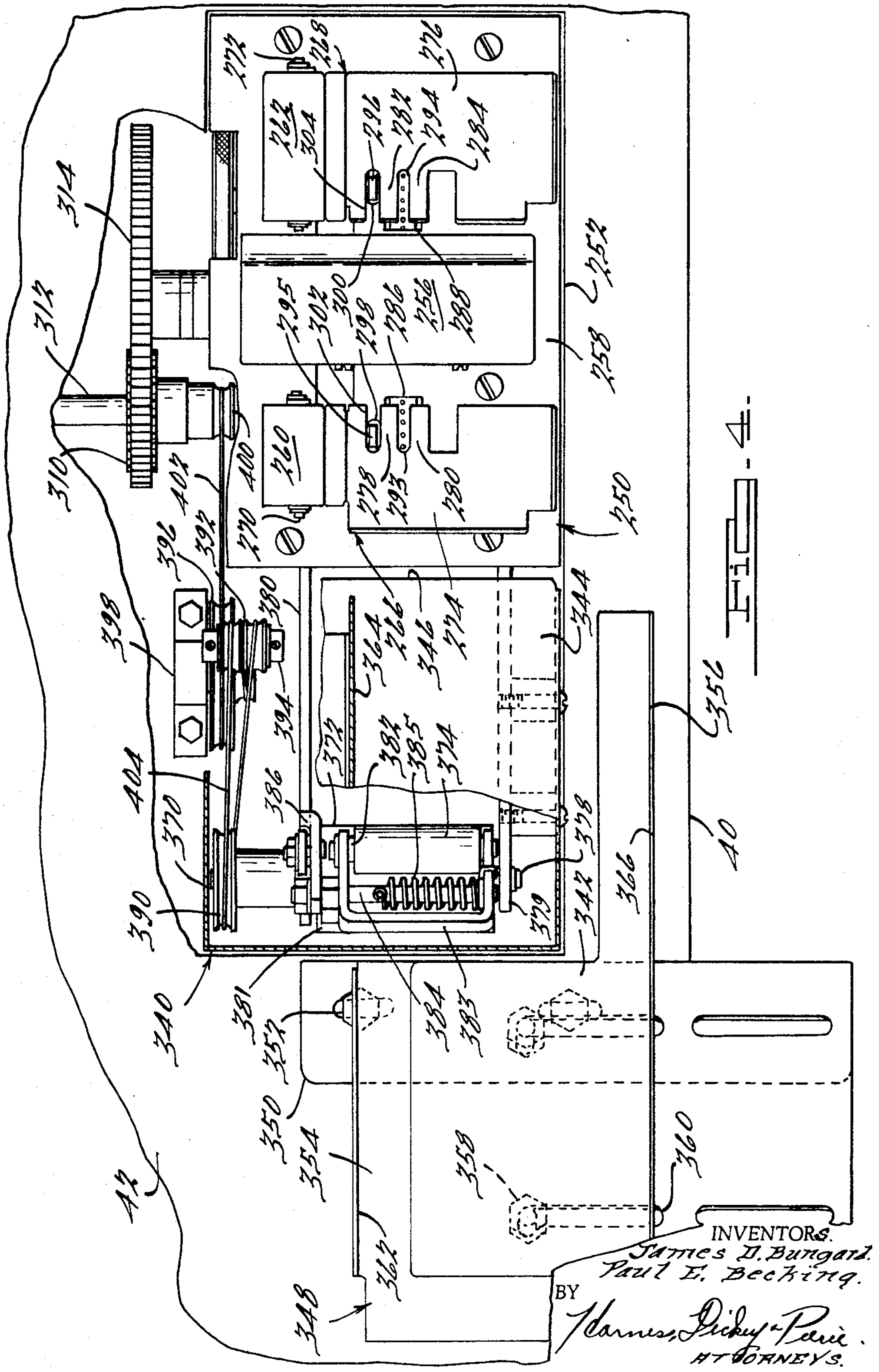
FIGURE 4 is a plan view, with parts broken away, of reader feed apparatus integrally associated with reader means of a business machine including an electric typewriter.

Referring now to FIGURES 4 and 5, a reader means unit 250 is mounted in a cutout 252 in the top plate 42 of the machine casing on the other side of the typewriter opposite the punch means unit 46. The rear wall 254 of the casing is indicated in phantom in FIGURE 5.

The reader means unit comprises a reader head 256 mounted in spaced relationship above a support plate 258 between data storage device feed heads 260, 262. Reading head 256 is of conventional design and, in the illustrative embodiment, comprises a light source providing a band of light over a reading slot in the plate 258 aligned with a plurality of photodiodes within the slot, there being one photodiode for each channel in the data storage device so that light traveling through a code hole in a particular code channel in the data storage device energizes a particular photodiode and an associated control circuit. The details of such a reading unit are disclosed fully in the aforementioned copending application.

Feed units 260, 262 are of substantially identical design and comprise pressure plates 266, 268 pivotally mounted on shaft means 270, 272 for pivotal upward movement from the closed position shown to an open position. Central portions 274, 276 are spaced closely adjacent the upper surface of plate 258 and have finger members 278, 280 and 282, 284 extending over cogwheel drive means 286, 288 mounted in slots in the plate 258. Slots 293, 294 in the central portions of the pressure plates receive the cogs and the finger members may have a curvature corresponding to the adjacent cylindrical portion of the cogwheels. Actuating fingers 295, 296 of control switch means (not shown) extend upwardly through slots 298, 300 in the plate 258 and may be received within slots 302, 304 in the pressure plates. The pressure plates are otherwise generally similar to the pressure plates associated with the punch feed apparatus.

Cogwheels 286, 288 are synchronously driven by the typewriter drive mechanism through a conventional one way clutch (not shown). A pinion 310 on input shaft 312 is connected to a step down gear 314 which is drivably connected to shaft 316 through the one way clutch by suitable gear means (not shown). An illustrative clutch arrangement is described in detail in the aforementioned copending application. A pinion 318 is mounted on the other end of shaft 316 and drives a ring gear 320 which, in turn, drives a gear 322 connected to shaft 324 of cogwheel 286. The ring gear is rotatably supported by a segment plate 326 and spaced shoe means 328, 330 as previously described with reference to the punch feed apparatus.

An automatic power driven card feed and loading means 340 is mounted at the front of the reader unit 256 (rear of the machine) and comprises inclined feed chute means provided by plate means 342, 344 which terminates at 346 closely adjacent the upper surface of plate 258. Loading means are provided by a bracket 348 having a flange portion 350 fastened to the casing as at 352. An upwardly inclined flange portion 354 adjustably supports an L-shaped guide member 356 by fastening elements 358 mounted in slots 360. Aligned guide flanges 362, 364 are suitably spaced from the guide flange 366 to guide the data storage devices through feeding means located in a housing 370.

The feeding means comprises roller elements 372, 374 having peripheral engagement with one another at 376 along the line of travel of the data storage device. Roller element 372, which is positively driven in substantial synchronization with the cogwheels 286, 288, is mounted on a drive shaft 378 rotatably supported by suitable bracket members 379, 380 and extends upwardly into a slot 381 in the plate 344.

Roller element 374, of smaller diameter than roller 372, is freely rotatably supported on by a shaft 382 between the leg portions of a U-shaped bracket 383 which is pivotally mounted on a shaft 384 and biased toward the roller 372 by spring means 385. Suitable bracket means 386 fixedly support the shaft 384. The upper roller may preferably be formed of a relatively soft non-marring material such as 30 durometer white neoprene which prevents damage to the data storage devices. The lower roller may advantageously be formed of nylon material enabling a certain amount of slippage relative to the data storage devices. Spring means 385 is chosen to provide sufficient pressure between the rolls to properly grip the lead edge of a card, inserted through an inlet slot 387 in the housing, and drive the card into reading position on the support plate 258 beneath reading head 256.

The roller drive means is preferably a belt and pulley arrangement permitting some slippage and comprises a pulley 390 mounted on the end of shaft 378, idler pulley clusters 392, 393 mounted on a bracket 394, pulleys 396, 397 mounted on a bracket 398, and a drive pulley 400 mounted on shaft 312. Suitable belt means 402, 404 drivingly connect the bottom roller 372 to the drive pulley 400. The gear and pulley sizes are selected to obtain the necessary or desired feed speed which is correlated with the feed speed of the cogwheels in such a manner that the card being fed is pushed (or pulled) at about the same rate of speed or slightly faster than the card is pulled (or pushed) by the cogwheels. The tension between the rollers is such as to permit some slippage sufficient to prevent damage to the cards as they are fed into place.

*Operation of reader data storage device feed apparatus*

Referring now to FIGURE 9, control switches 408, 410, which are actuated by fingers 294, 296, respectively, are shown illustratively in circuit with a portion of the machine reader means circuitry. It will be understood by those skilled in the art to which the invention relates that the arrangement of the control switches relative to the reader means circuitry may be modified or changed as necessary or desirable to accomplish the desired results. In the particular arrangement presently being utilized, the switches 408, 410 are connected in series between sources of opposite potential 414, 416 with the reader clutch solenoid 418 and certain other circuit controls associated therewith. It will be further understood that the other circuit controls are variously otherwise connected in the read means control circuitry. The reader clutch solenoid, when energized, permits one way movement of the cogwheel means 286, 288 in a step-by-step fashion adapted to move the data storage devices past the reading means in step-by-step fashion with each code column being brought successively into reading position in the reading means.

Roller 372 is directly connected to the continously rotating shaft 312 whereas the cogwheels 286, 288 are only intermittently connected thereto through the reader clutch which is controlled by the reader clutch solenoid 418. When a data storage device is inserted through slot 387 between the rolls, the data storage device is frictionally gripped and driven downwardly. As the lead edge of a card or the like approaches and is positioned on the cogwheel 286, finger 294 is depressed to close switch 408 and complete an enabling circuit for clutch solenoid 418.

Consequently, when the control circuitry is properly conditioned, the clutch solenoid 418 is energized and the cogwheels are driven step-by-step in a conventional manner to advance the card to and beneath the reading head in step-by-step fashion permitting reading of each code column as the card progresses past the reading head. When the leading edge of the card engages and actuates the finger 296, the switch 410 is closed so that the enabling circuit is maintained after the trailing edge of the card passes the finger 294 until the trailing edge also passes the finger 296.

Such an arrangement enables a second card to be immediately fed into the machine after the first card. The lead edge of the second card may contact the finger 294 and close switch 408 before the trailing edge of the first card passes by the finger 296. Consequently, the feed clutch solenoid is constantly enabled as long as either of the switches 408, 410 are closed.

The inventive principles hereinbefore described by reference to an illustrative embodiment may be otherwise variously embodied and modified without departing from the intended scope of the appended claims except as limited by the prior art.

The invention claimed is:

1. In a business machine having a typewriter unit, a punch unit operable in response to typewriter unit operation to code multiple type data storage devices with coded data capable of reproducing the typewriter unit operation, and a reader unit operable to read such coded data storage devices and cause operation of the typewriter unit duplicating the coded operation: multiple type data storage device handling apparatus associated with both said punch unit and said reader unit and being capable of handling both card type data storage devices and tape type data storage devices; separate card and tape data storage device driving means associated with both said punch unit and said reader unit; separate card feed chute means associated with both said punch unit and said reader unit for guiding a card type data storage device into association with said data storage device driving means; power operable roller means associated with the card feed chute means associated with said reader unit to positively drive card type data storage devices into association with the reader unit driving means, said roller means comprising a bottom roller and a top roller, and spring biased support means for said top roller biasing said top roller toward peripheral engagement with said bottom roller under a predetermined optimum load.

2. The invention as defined in claim 1 and wherein the speed of said power operable roller means is equal to or greater than the speed of the reader unit driving means whereby drag on a card type data storage device during transfer to the reader unit driving means is prevented.

3. The invention as defined in claim 1 and having drive means for said bottom roller connected to power means common to said reader unit driving means.

4. The invention as defined in claim 1 and wherein said top roller is made of a non-marring white neoprene type material having a durometer on the order of 30.

5. The invention as defined in claim 1 and wherein said bottom roller is made of a material such as nylon and said drive means comprises a belt and pulley arrangement permitting slippage of the rollers relative to the card type data storage devices.

6. The invention as defined in claim 1 and having control means limiting actuation of said punch unit and said reader unit in accordance with position of a data storage device relative thereto.

7. The invention as defined in claim 6 and wherein, for said punch unit, said control means comprises a first switch operable upon location of the data storage device at a start position to initiate a feed operation, and a second switch operable upon location of the data storage device at a punch position to terminate said feed operation.

8. The invention as defined in claim 7 and having a plurality of driving means associated with said punch unit, at least one of said driving means being provided for each of the data storage device types, and separate data storage device guide means associated with each of said driving means.

9. The invention as defined in claim 6 and wherein, for said reader unit, said control means comprises a first switch operable upon location of the data storage device at a start position to initiate a feed operation when actuated by the presence of a data storage device, and a second switch spaced beyond said first switch in the path of movement of the data storage device and being operable upon location of the data storage device thereagainst to continue said feed operation until the data storage device passes therebeyond, said second switch being spaced from said first switch a distance sufficient to enable at least two of the data storage devices to be simultaneously fed through said reader unit.

10. The invention of claim 9 and having at least two spaced driving means for the data storage device, said driving means being synchronously drivingly connected.

11. The invention as defined in claim 1 and wherein said data storage device driving means for the punch unit comprises spaced cogwheels located on opposite sides of said punch unit, one of said cogwheels being located to drive cards to said punch unit, the other of said cogwheels being located to drive cards or tape from said punch unit, and common drive means interconnecting and synchronously driving said cogwheels.

12. The invention as defined in claim 11 and having separate tape and card guide means associated with said one of said cogwheels, and common tape and card guide means associated with the other of said cogwheels.

13. The invention as defined in claim 11 and having a first control switch located adjacent the one cogwheel and being operable by the lead edge of a card properly positioned on said one cogwheel, circuit means connected to said drive means to cause actuation of said one cogwheel when said first control switch is operated, and control means operable by said card to de-actuate said one cogwheel when the lead edge reaches a predetermined position.

14. The invention as defined in claim 13 and wherein said control means comprises a switch finger aperture centrally located on said card and spaced from the lead edge a predetermined distance such that said first control switch will be located in said aperture when the lead edge reaches said predetermined position.

15. The invention as defined in claim 1 and wherein said data storage device driving means for the reader unit comprises spaced cogwheels located on opposite sides of said reader unit, and common cogwheel drive means interconnecting and synchronously driving said cogwheels.

16. The invention as defined in claim 15 and said common cogwheel drive means comprises a ring gear connecting said cogwheel drive means to reduce inertia forces tending to move the card beyond a predetermined position.

17. The invention as defined in claim 1 and comprising feed control apparatus for initially moving a data storage device to a predetermined position in the punch unit and thereafter moving the data storage device through the punch unit, the data storage device having a leading edge and a trailing edge and locating means therebetween, comprising: a first feeding mechanism located on one side of said punch unit and a second feeding mechanism located on the opposite side of said punch unit, a feed clutch solenoid operable when energized to actuate said first and second feeding mechanisms, a first control switch operable to energize said feed clutch solenoid, actuating means for said first control switch located adjacent said first feeding mechanism and being operable by engagement with said data storage devices to permit actuation of said first feeding mechanism after the leading edge of a data storage device has passed thereover, actuating means for said second control switch being located for association with the locating means on the data storage device when the data storage device reaches a predetermined position and being operable by association with said locating means to stop initial movement of said data storage device, and control circuit means for subsequently energizing said feed clutch solenoid after attainment of said predetermined position to move said data storage device completely through said punch unit by driving engagement with said first and second feeding mechanisms.

18. The invention as defined in claim 1 and said feed chute means for said reader unit comprising a bracket attached to said business machine, an inclined feed chute mounted on said bracket, a roller housing located at the bottom of said inclined feed chute, a card inlet slot provided in said housing, said roller means being mounted in said housing adjacent said inlet slot, guide plate means extending through said housing, an outlet provided in said housing opposite said inlet slot, said driving means comprising card feeding cogwheel means mounted adjacent said outlet, reader means mounted adjacent said cogwheel means, and control means operable after movement of the card through the housing by said roller means by engagement with the leading edge of the card adjacent the cogwheel means to cause actuation of the cogwheel means to move the card into said reader means.

19. The invention as defined in claim 18 and having additional control means operable by engagement with the card beyond the reader means to cause continued actuation of the cogwheel means to remove the card from said reader means.

References Cited

UNITED STATES PATENTS

| | | | |
|---|---|---|---|
| 2,889,984 | 6/1959 | Gruver | 235—61.11 |
| 2,877,081 | 3/1959 | Dodge | 346—85 |
| 2,690,221 | 9/1954 | Brand | 164—113 |
| 2,264,622 | 12/1941 | Dickinson | 235—61.10 |
| 2,894,614 | 7/1959 | Lambert et al. | 197—20 |
| 2,965,170 | 12/1960 | Perez et al. | 234—30 |

MAYNARD, R. WILBUR, *Primary Examiner.*

DARYL W. COOK, *Examiner.*

R. COUNCIL, T. J. SLOYAN, *Assistant Examiners.*